A. A. & W. NELSON.
HARROW.
APPLICATION FILED JUNE 5, 1916.
1,243,203.
Patented Oct. 16, 1917.
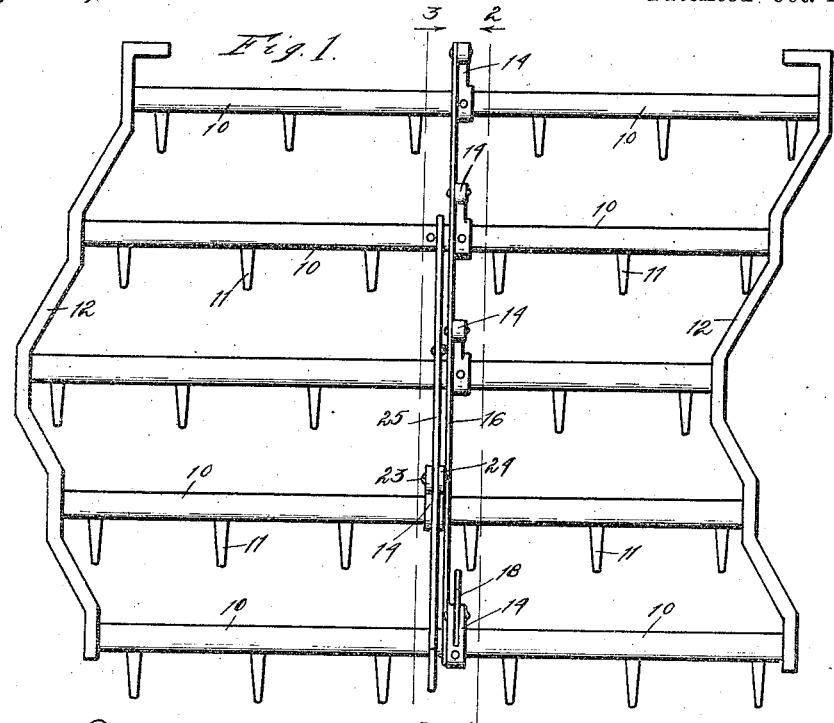
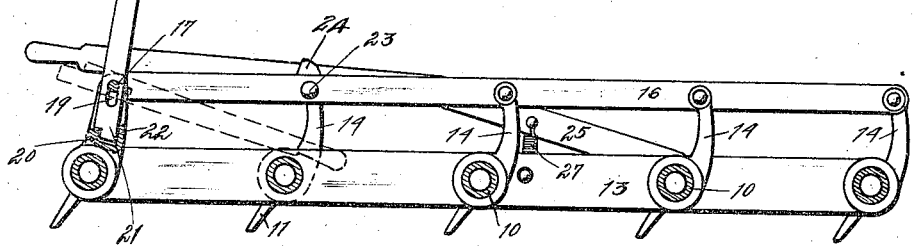
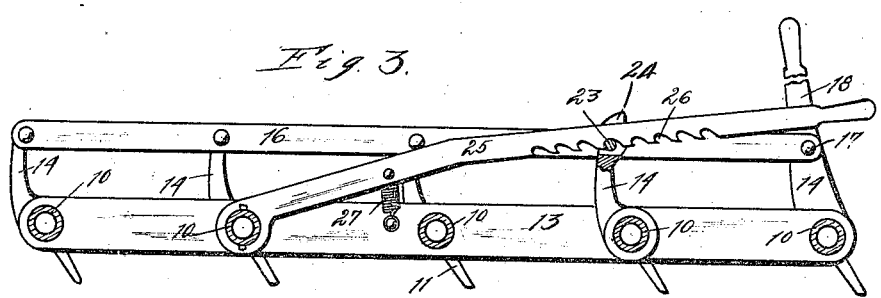

UNITED STATES PATENT OFFICE.

ALFRED A. NELSON AND WALTER NELSON, OF ATLANTIC, IOWA.

HARROW.

1,243,203.

Specification of Letters Patent.   Patented Oct. 16, 1917.

Application filed June 5, 1916.   Serial No. 101,746.

*To all whom it may concern:*

Be it known that we, ALFRED A. NELSON and WALTER NELSON, citizens of the United States, and residents of Atlantic, in the county of Cass and State of Iowa, have invented a certain new and useful Harrow, of which the following is a specification.

Our invention relates to harrows capable of being adjusted to various angles of the harrow teeth with relation to the ground.

More particularly it is our object to provide a harrow having a plurality of transverse teeth, supporting members capable of being rotated for varying the angle of the teeth with relation to the surface of the ground, and having simple and durable mechanism easily operated for controlling said transverse members.

A further object is to provide in a harrow such mechanism adapted to occupy a comparatively little space.

Our invention consists in the construction, arrangement and combination of the various parts of the device, whereby the objects contemplated are attained as hereinafter more fully set forth, pointed out in our claims and illustrated in the accompanying drawings, in which:

Figure 1 shows a top or plan view of a harrow embodying our invention.

Fig. 2 shows a longitudinal, vertical, sectional view taken on the line 2—2 of Fig. 1, and Fig. 3 shows a sectional view taken on the line 3—3 of Fig. 1.

Our improved harrow comprises a plurality of transverse members spaced from each other and indicated in the illustration of our invention, shown in the accompanying drawings, by the reference character 10.

Each harrow section is provided with two end members 12 on which the transverse members 10 are rotatably mounted.

The transverse members 10 are also preferably rotatably mounted in a central, longitudinal frame member 13, whereby the central parts of the members 10 are held partly spaced from each other and are also held in alinement with each other.

Each of the members 10 is provided with an upwardly extending arm 14.

Pivoted to the upper ends of the arms 14 is a connecting bar 16. The upper end of the arm 14 on the rearward member 10 is bifurcated. A pivot pin 17 pivotally connects the upper ends of the bifurcated portion of the rearward arm 14 with the connecting bar 16.

Received between the ends of the bifurcated portion of the rearward arm 14 is one end of a lever 18. The lever 18 is provided between its ends with an elongated slot 19. Between the bifurcated ends of the rearward arm 14 at the lower ends of said bifurcated portion is a downwardly extending slot 20 adapted to receive a downward extension 21 on one end of the lever 18 when the lever is at one end of its sliding movement, on the pivot pin 17.

The arms of the bifurcated portion are connected at their forward edges by a web or the like 22 near their lower parts.

The web 22 is so located as to serve at all times as a means, whereby the pivotal movement of the lever 18 in all directions is limited.

The pivot pin 17, the slot 19 and the slot 20 are so located and arranged that in one position of the lever 18 the extension 21 will be received in the slot 20, and the lever 18 can then be used to rotate the members 10 through the medium of the arms 14 and the bar 16 for regulating the position of the harrow teeth 11.

When in use, lever 18 may be slightly lifted for removing the extension 21 from the slot 20, whereupon the lever 18 may be swung forwardly and outwardly to the position shown by the dotted lines in Fig. 2, where the lever 18 will not interfere with the use of the harrow in any way, and will lie close to the harrow, so that the harrow may be stored in a minimum space.

It will be noted that the user of the harrow may simply put his foot on the short end of the lever 18 when said lever is in the position shown by dotted lines in Fig. 2 and force said short end downwardly and forwardly, thereby moving the lever 18 to position substantially in alinement with the rearward arm 14.

Whenever the long free end of the lever 18 is above center with relation to the pivot pin 17, it will be seen that the weight of the lever 18 will tend to cause said lever to slide longitudinally with relation to the rearward arm 14 and cause the extension 21 to drop into the slot 20. This makes it very easy for the user of the harrow, from a position in the rear of the harrow, to manipulate the lever 18 for moving it from its folded, collapsed position, to its extended operative position.

For locking the members 10 in any of their adjusted positions, the following means have been provided.

The arm 14, next to the rear member 10 is pivoted to the connecting bars 16 by a pivot pin 23, and is provided with a pair of upwardly extending ears 24 above the pin 23.

Pivotally mounted on one of the forward members 10 is a rearwardly and upwardly extending locking lever 25 in the lower edge of which is formed a plurality of notches 26.

The locking lever 25 is adapted to be received between the ears 24 in such position that the notches 26 coact with the pivot pin 23.

A coil spring 27, connected with the lever 25 and with the member 13, tends to yieldingly hold the lever 25 in position where the pin 23 is received in one of the notches 26.

The locking lever 25 may be loosely mounted on the member 10 or made of such resilient material that it may rest against the pressure of the spring 27 and be swung laterally to clear the ears 24 and drop downwardly adjacent to the members 10.

In the practical use of our improved harrow, assuming that the harrow teeth and parts are substantially in the position shown in Fig. 2, where the teeth are at such an angle as might be adapted for cultivation, then if it is desired to make the angle of the teeth with relation to the ground more obtuse, and if the lever 18 is in the position shown by the dotted lines in Fig. 2, the operator may press downwardly on the shorter end of the lever 18 preferably with a quick movement, which swings the lever 18 to the position shown by the full lines in Fig. 2. The lever will then drop by gravity to position with the extension 21 received in the slot 20. By drawing the lever 18 rearwardly, the user of the harrow may then move the teeth 18 toward or past upright position.

The lever 18 may then be raised and dropped forwardly.

If it is desired to rotate the members 10 for swinging them forwardly and downwardly and moving the teeth 11 to position extending rearwardly lying almost flat with the ground for transporting the harrow from the ground rather than for cultivating the lever 18 is moved to its upright operative position. The locking lever 25 is then raised and swung laterally releasing the pin 23 from the notches 26. Until this is done, the parts are held by the locking lever 25 against any forward movement of the lever 18 when said lever is in operative position.

When the locking lever has been released, the lever 18 may be moved forwardly for performing the desired operation.

Some changes may be made in the construction and arrangement of our improved harrow and it is our intention to cover by this application any such modifications of structure, wherein our real invention may be embodied, so far as such modifications may be included within the reasonable scope of our claims;

We claim as our invention:

1. A harrow comprising end members, spaced transverse members rotatably mounted with relation thereto, teeth mounted on said transverse members, upwardly extending arms on said transverse members, a connecting bar pivoted to the upper ends of said arms, a lever having an elongated slot near one end, a pin on one of said arms received in said slot, an extension on the short end of said lever, said last described arm being provided with a slot for receiving said extension in one position of said lever, the parts being so constructed that said lever may be dropped downwardly adjacent to said transverse members, or may be raised and moved longitudinally to position with said extension received in the slot in said last described arm.

2. A harrow comprising end members, spaced transverse members rotatably mounted with relation thereto, teeth mounted on said transverse members, upwardly extending arms on said transverse member, a connecting bar pivoted to the upper ends of said arms, a lever having an elongated slot near one end, a pin on one of said arms received in said slot, an extension on the short end of said lever, said last described arm being provided with a slot for receiving said extension in one position of said lever, the parts being so constructed that said lever may be dropped downwardly adjacent to said transverse members, or may be raised and moved longitudinally to position with said extension received in the slot in said last described arm, and a locking lever for preventing a movement of said arms in one direction.

3. A harrow comprising end members, spaced transverse members rotatably mounted with relation thereto, teeth mounted on said transverse members, upwardly extending arms on said transverse members, a connecting bar pivoted to the upper ends of said arms, a lever having an elongated slot near one end, a pin on one of said arms received in said slot, an extension on the short end of said lever, said last described arm being provided with a slot for receiving said extension in one position of said lever, the parts being so constructed that said lever may be dropped downwardly adjacent to said transverse member, or may be raised and moved longitudinally to position with said extension received in the slot in said last described arm, a locking lever for preventing a movement of said arms in one direction, and permitting movement of said arms in the opposite direction.

4. A harrow comprising end members, spaced transverse members rotatably mounted with relation thereto, teeth mounted on said transverse members, a connecting bar pivoted to the upper ends of said arms, a lever having an elongated slot near one end, a pin on one of said arms received in said slot, an extension on the short end of said lever, said last described arm being provided with a slot for receiving said extension in one position of said lever, the parts being so constructed that said lever may be dropped downwardly adjacent to said transverse member, or may be raised and moved longitudinally to position with said extension received in the slot in said last described arm, a locking lever for preventing a movement of said arms in one direction, and permitting movement of said arms in the opposite direction, said lever being pivoted to one of said transverse members, and having a plurality of notches, said device including a means adapted to be selectively received in said notches.

5. A harrow comprising end members, spaced transverse members rotatably mounted with relation thereto, teeth mounted on said transverse members, a connecting bar pivoted to the upper ends of said arms, a lever having an elongated slot near one end, a pin on one of said arms received in said slot, an extension on the short end of said lever, said last described arm being provided with a slot for receiving said extension in one position of said lever, the parts being so constructed that said lever may be dropped downwardly adjacent to said transverse member, or may be raised and moved longitudinally to position with said extension received in the slot in said last described arm, a locking lever for preventing a movement of said arms in one direction, and permitting movement of said arms in the opposite direction, said lever being pivoted to one of said transverse members, and having a plurality of notches, said device including a means adapted to be selectively received in said notches, and means for yieldingly holding said locking lever in operative position, said locking lever being capable of lateral movement for clearing the means which enters said notches.

Des Moines, Iowa, May 13, 1916.

ALFRED A. NELSON.
WALTER NELSON.

Copies of this patent may be obtained for five cents each, by addressing the "Commissioner of Patents. Washington, D. C."